June 6, 1967
D. A. CASWELL
3,324,418
SWITCHING CIRCULATOR HAVING SLOTS EXTENDING
FROM THE POLE PIECES TO THE EXTERIOR
OF THE HOUSING TO OVERCOME
THE SHORTED-TURN EFFECT
Filed Oct. 23, 1964
5 Sheets-Sheet 1
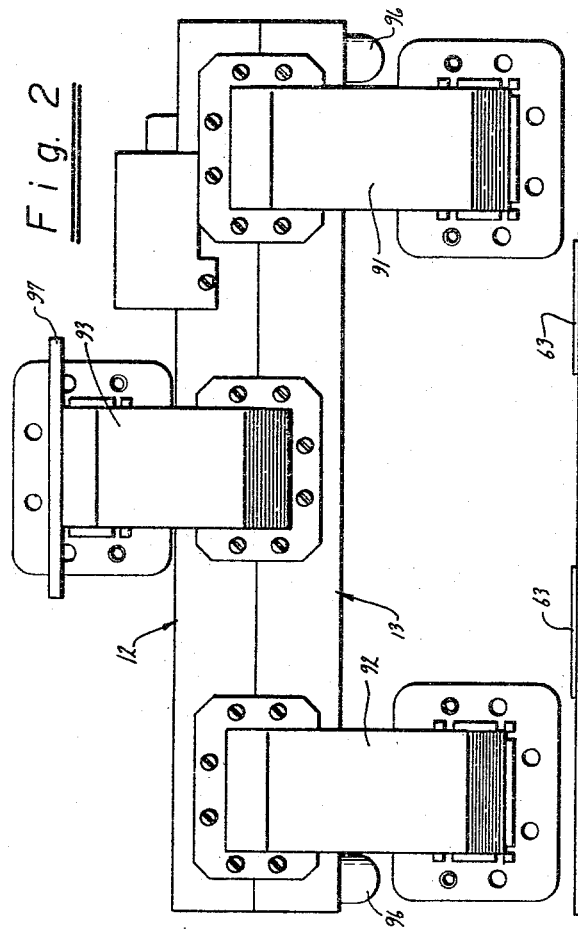
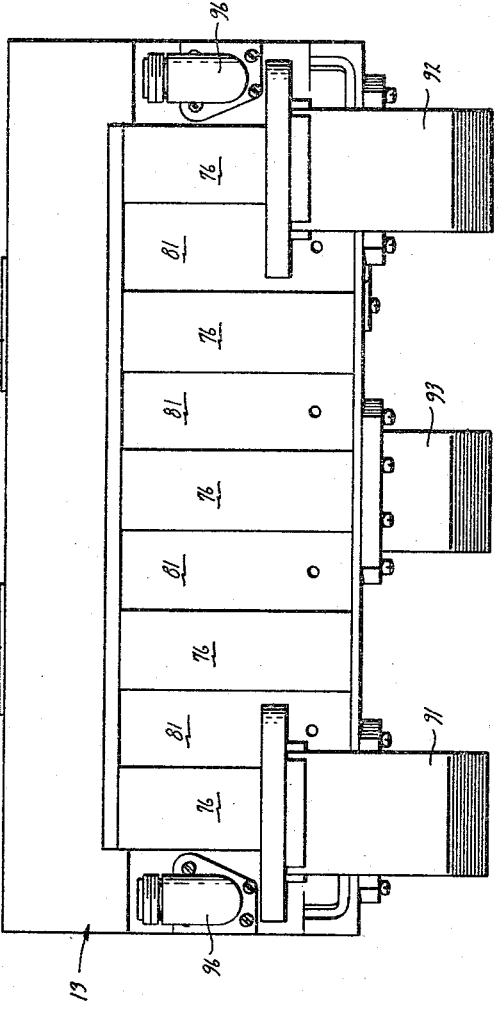
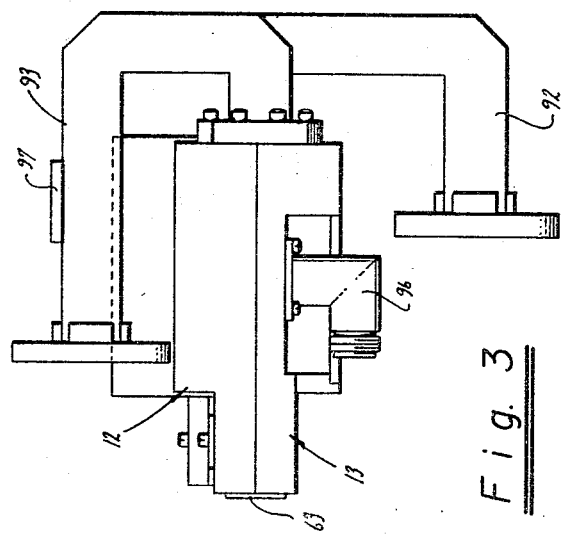
INVENTOR.
Dwight A. Caswell
BY
Attorneys INVENTOR.
Dwight A. Caswell
BY
Attorneys INVENTOR.
Dwight A. Caswell
BY
Attorneys June 6, 1967
D. A. CASWELL
3,324,418
SWITCHING CIRCULATOR HAVING SLOTS EXTENDING
FROM THE POLE PIECES TO THE EXTERIOR
OF THE HOUSING TO OVERCOME
THE SHORTED-TURN EFFECT
Filed Oct. 23, 1964
5 Sheets-Sheet 5
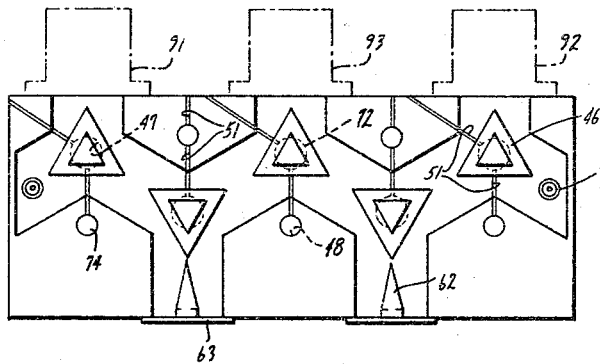
Fig. 10
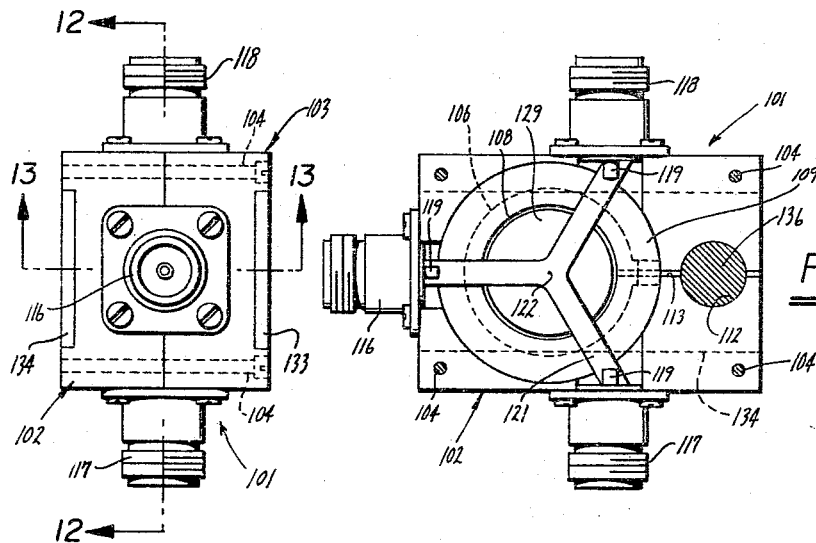
Fig. 12
Fig. 11
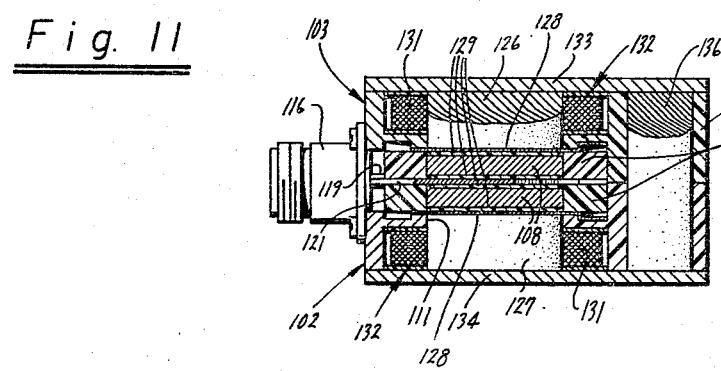
Fig. 13
INVENTOR.
Dwight A. Caswell
BY
*Flehr and Swain*
Attorneys United States Patent Office 3,324,418
Patented June 6, 1967

3,324,418
SWITCHING CIRCULATOR HAVING SLOTS EXTENDING FROM THE POLE PIECES TO THE EXTERIOR OF THE HOUSING TO OVERCOME THE SHORTED-TURN EFFECT
Dwight A. Caswell, Saratoga, Calif., assignor to Caswell Electronics Corporation, San Jose, Calif., a corporation of California
Filed Oct. 23, 1964, Ser. No. 406,046
10 Claims. (Cl. 333—1.1)

This invention relates to a switching circulator and more particularly to a switching circulator which utilizes a transverse magnetic field.

At the present time, there is a need for switching circulators which switch in very short periods of time as, for example, .001 of a second. Switching circulators heretofore available were not suitable.

In general, it is an object of the present invention to provide a switching circulator which can be switched over rapidly.

Another object of the invention is to provide a switching circulator of the above character which utilizes a transverse magnetic field.

Another object of the invention is to provide a switching circulator of the above character in which the shorted-turn effect is overcome.

Another object of the invention is to provide a switching circulator of the above character which can be cascaded.

Another object of the invention is to provide a switching circulator of the above character which can be formed with wave guide or coaxial transmission line sections.

Another object of the invention is to provide a switching circulator which is relatively simple and economical to manufacture.

Additional features and advantages of the invention will appear from the following description in which the preferred embodiments are set forth in detail in conjunction with the accompanying drawings.

Referring to the drawings:

FIGURE 1 is a top plan view of a switching circulator incorporating the present invention.

FIGURE 2 is a rear elevational view of the switching circulator shown in FIGURE 1.

FIGURE 3 is an end elevational view of the switching circulator shown in FIGURE 1.

FIGURE 10 is a cross-sectional view similar to FIGURE 7 of another embodiment of the switching circulator shown in FIGURE 1.

FIGURE 11 is a side elevational view of another embodiment of the switching circulator particularly adapted for use with frequencies in which coaxial lines can be used.

FIGURE 12 is a cross-sectional view taken along the line 12—12 of FIGURE 11.

FIGURE 13 is a cross-sectional view taken along the line 13—13 of FIGURE 11.

Figure 4:
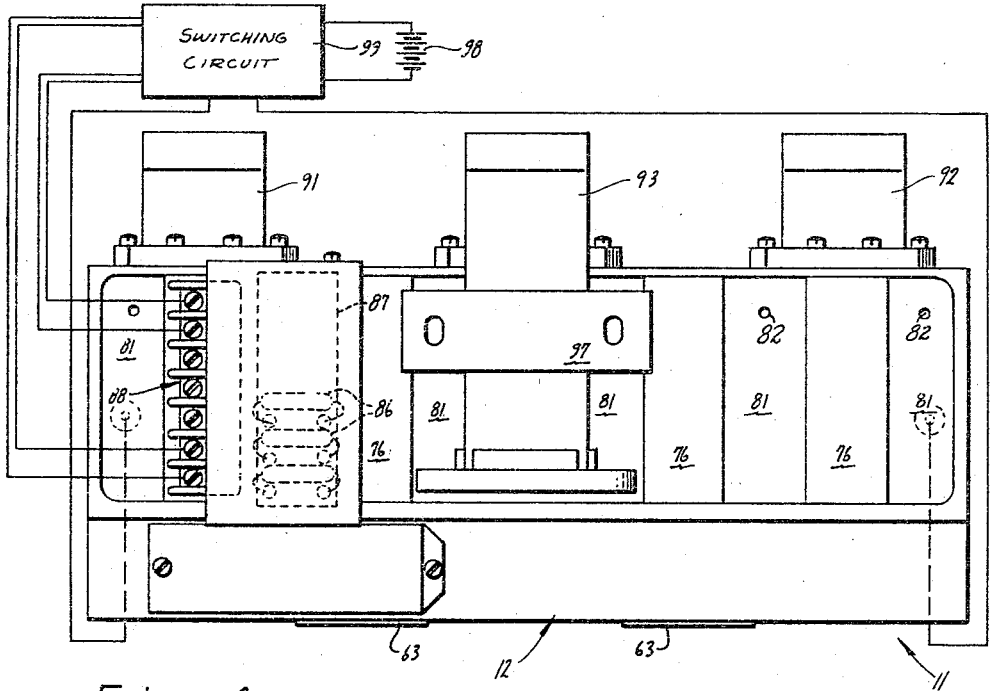
FIGURE 4 is a bottom plan view of the switching circulator shown in FIGURE 1.
Figure 5:
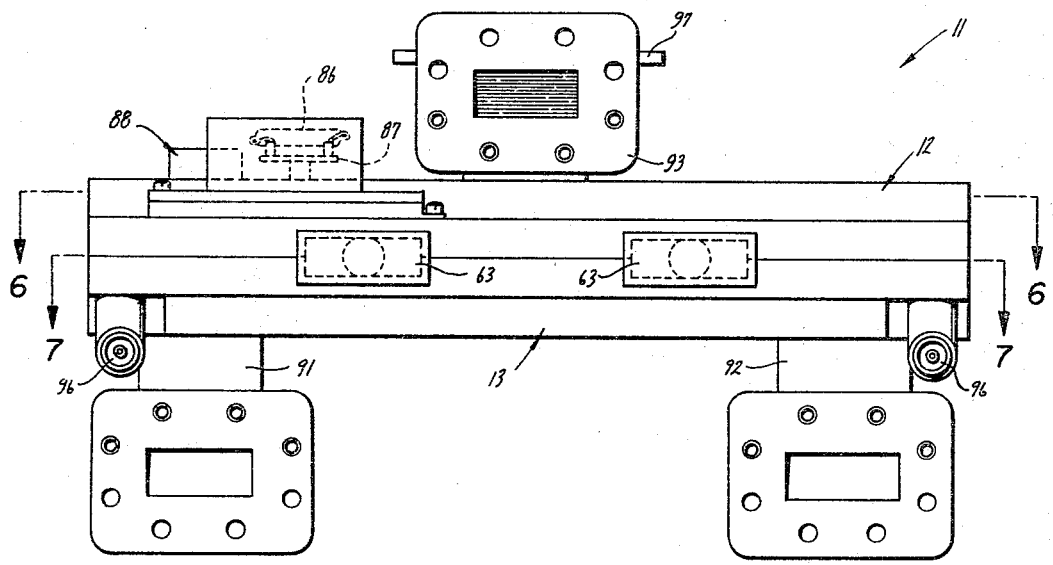
FIGURE 5 is a front elevational view of the switching circulator shown in FIGURE 1.

In general, the switching circulator incorporating the present invention consists of a metal housing which has at least first, second and third transmission line sections formed in said housing and interconnected by a junction. A gyromagnetic body is disposed in the vicinity of the junction interconnecting said first, second and third sections. Means including pole pieces mounted in the housing is provided for establishing a magnetic field transverse to the direction of propagation of wave energy through said transmission line sections to bias said gyromagnetic material to cause wave energy to travel from one of the transmission line sections into only one of the other of the second and third transmission line sections. The housing has a slot therein extending from the pole pieces out to the exterior of the housing to prevent the formation of a shorted-turn in the housing about the pole pieces.

As shown in FIGURES 1–9 of the drawings, the switching circulator shown therein consists of a metal housing 11 which is formed primarily from two bodies 12 and 13. The bodies 12 and 13 can be formed of any suitable material such as aluminum castings. The bodies or castings 12 and 13 are generally of the same configuration and each of the bodies is formed with a large rectangular recess 14 which is defined by a flat planar bottom wall 16, side walls 17 and 18 extending outwardly away from the bottom wall at a direction at right angles to the bottom wall and end walls 19 and 21 which also extend outwardly away from the bottom wall 16 at right angles thereto. The side walls 17 and 18 and the end walls 19 and 21 are provided with ledges 22 for a purpose hereinafter described extending around the perimeter of the rectangular recess 14.

Five symmetrical Y-type circulators 26 are disposed within the housing 11. As hereinafter explained, any number of circulators from one on up can be utilized while still incorporating the present invention. Each of the Y-type circulators includes first, second and third transmission line sections 27, 28 and 29 spaced 120° apart and joined by a junction 31. The transmission line sections are formed in the bodies 12 and 13 and, as shown in the embodiment in FIGURES 1–9, take the form of rectangular wave guides of the metallic type having a wide cross-sectional dimension at least one-half wave length of the energy to be conducted thereby and a narrow dimension substantially one-half of the wide dimension.

Each of the bodies is provided with lapped planar surfaces 32 which are adapted to fit very closely with each other. The wide internal cross-sectional dimension of each of the wave guide sections is formed by planar wall portions 33 formed in the bodies 12 and 13 substantially parallel to the surfaces 32. The narrow internal cross-sectional dimension is formed by walls 33 extending in a direction substantially perpendicular to the surfaces 32 with one-half of the narrow dimension being formed in each of the bodies 12 and 13.

Figure 7:
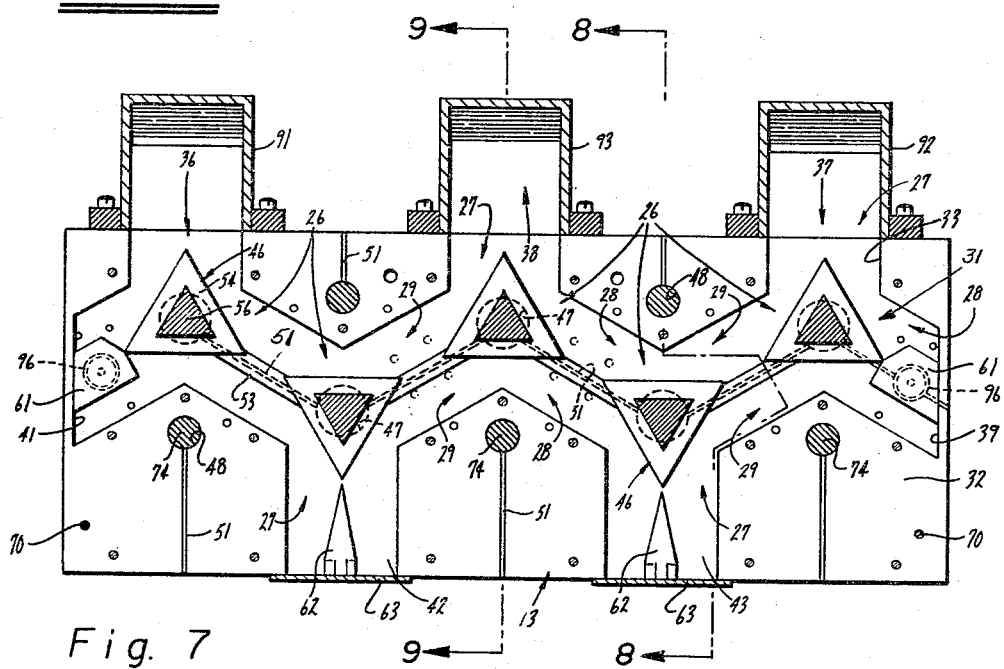
FIGURE 7 is a cross-sectional view taken along the line 7—7 of FIGURE 5.
Figure 9:
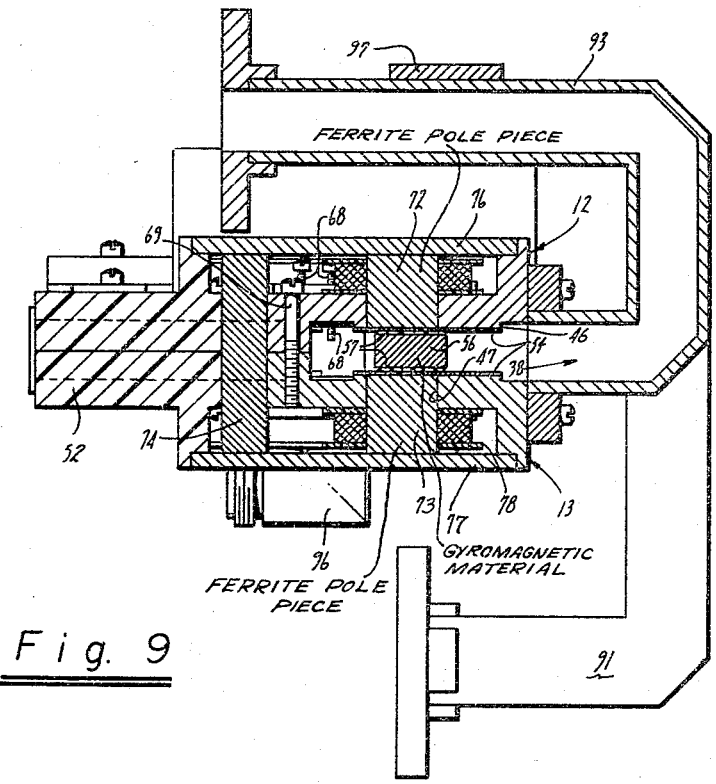
FIGURE 9 is a cross-sectional view taken along the line 9—9 of FIGURE 7.
Figure 8:
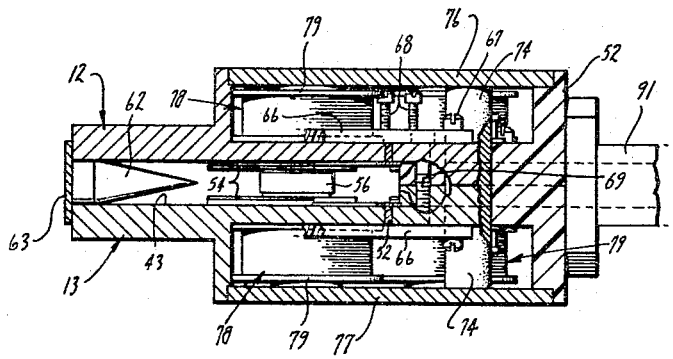
FIGURE 8 is a cross-sectional view taken along the line 8—8 of FIGURES 6 and 7.

As can been particularly in FIGURE 7, the five Y-type circulators 26 are interconnected with each other. Thus, the corresponding branches or transmission line sections are interconnected as shown so that the Y-type circulators are cascaded, or, in other words, connected in series. When connected in this manner, the five circulators are provided with two inlet ports 36 and 37 and one outlet port 38. The circulators are also provided with two end ports 39 and 41 and two side ports 42 and 43. The end ports 39 and 41 and the side ports 42 and 43 are terminated as hereinafter described.

Each of the bodies 12 and 13 is provided with raised equilateral triangular portions 46 disposed in the vicinity of the junction 31 and having their three apexes centered and facing the transmission line sections 27, 28 and 29. These triangular portions serve as matching elements. Each of the bodies 12 and 13 is also provided with a hole 47 extending through the triangular portion at right angles thereto and being centered within the triangular portion. Additional holes 48 are provided on each of the bodies extending through the surfaces 32 at right angles thereto and in alignment with each of the holes 47.

Means is provided in the bodies 12 and 13 to overcome the short-turn effect of the bodies and consist of slots 51 which extend from each of the holes 47 and 48 to a point which is exterior of the housing. As can be seen particularly from FIGURES 6 and 7, the slots 51 extending from the holes 48 extend directly from the holes out through the side wall of the body. On the other hand, the slots 51 extending from the holes 47 to the exterior of the body are interconnected as shown so that none of the holes 47 have metal completely surrounding the same, but have the metal interrupted by the slots 51. It should be pointed out that the slots 51 connecting the holes 47 to the exterior of the bodies 12 and 13 have been cut into the body approximately along the zero current lines of the circulators.

After the slots have been cut into the bodies 12 and 13, the slots are filled with a suitable insulating material 52 such as an epoxy resin. Thereafter, the slots 51 connecting the holes 51 to the exterior of the bodies are covered with very thin strips 53 of a suitable conducting material such as aluminum foil having a thickness of .001 of an inch to serve as a conductor for microwave energy as hereinafter described. The strips 53 are secured to the surface 33 by suitable material such as cement. The strips 53 need not necessarily be insulated from the bodies 12 and 13. It has been found that when aluminum castings are used, they can be chemically treated to provide a substantially non-conducting surface so that the strips 53 are insulated from the bodies 12 and 13.

The upper surfaces of the triangular portions are precisely routed so that the spacing between the triangular portions is very precise. Thereafter, very thin strips of conducting material 54 of a suitable type such as aluminum foil having a thickness of .001 of an inch is cemented to the exposed outer surfaces of the triangular portions 46. Thereafter, the strips 53 and the sheets 54 are joined together by suitable conducting material such as silver paint extending downwardly over the side portions of the triangular portion 46 to the conducting strips 53 so that the conducting strips 53 and the triangular sheets 54 are all interconnected to form a microwave bridge over the slots 51.

In order to achieve ultimate performance, it may be desirable to place an insulating layer between the strips 53 and the sheets 54 as, for example, by first applying a thin coat of acrylic plastic to the body before the strips 53 and the sheets 54 are cemented thereto.

An element formed of a suitable gyromagnetic material, such as a garnet triangle 56, is disposed between the triangular portions 46 and 47 in the vicinity of the junction 31. A very thin triangular insulating layer 57 of a suitable material such as Teflon having a suitable thickness as .0015 inch is cemented to opposite sides of the garnet triangle. One of the layers 57 with the garnet triangle 56 is cemented to the triangular aluminum sheet 54 on one of the bodies 12 and 13. The Teflon pieces 57 are used for improving the match of the circulator. The garnet triangle 56 is positioned so that its apexes are also facing in the same direction as the apexes of the triangular portions 46. In other words, they are also centered in the transmision line sections 27, 28 and 29 and face these sections.

The end ports 39 and 41 are terminated in conventional step loads 61, whereas the side ports 42 and 43 are terminated in cone-shaped loads 62 also of a conventional type. The loads 61 and 62 are secured within the ports in a suitable manner such as by cement. The ports 42 and 43 are, in addition, closed by removable plates 63 to permit access to the ports 42 and 43 if desired.

After the bodies 12 and 13 have been provided with slots 51 as hereinbefore described, it may be desirable to strengthen the body by utilizing a plurality of reinforcing pieces 66 formed of a suitable insulating material which extend across the slots 51 and which are secured to the body by screws 67. Additional tuning screws 68 are provided in certain of the reinforcing pieces 66 for a purpose hereinafter described. As shown particularly in FIGURE 6, two tuning screws 68 have been provided on each side of the slots 51 between the second and third, and third and fourth circulators, counting from the left as viewed in FIGURE 7.

The two bodies 12 and 13 are secured together into a unitary assembly by suitable means such as a plurality of screws 69 which extend through one body and threaded into the other body. Dowel pins 70 are provided in the bodies 12 and 13 to facilitate mating of the two bodies before the screws 69 are inserted.

Means is provided for establishing a magnetic field which is applied transversely, i.e., at right angles to the direction of propagation of wave energy in the inlet transmission line section of each of the circulators and consists of a C-type electromagnet assembly 71 associated with each of the circulators 26. The electromagnet assembly 71 is provided with a core of suitable ferromagnetic material such as ferrite. Thus, the electromagnet assembly consists of first and second cylindrical pole pieces 72 and 73, formed of ferrite, mounted in the holes 47 in the bodies 12 and 13 and extending through the triangular portions 46 and having their faces cemented to the thin metal strips 54 covering the triangular portions 46. The cylindrical pole pieces 72 and 73 are also cemented into the holes 47. Each electromagnet assembly 71 also consists of a long cylindrical rod 74 also formed of ferrite which extends through one of the holes 48 in each of the bodies 12 and 13. Plates 76 and 77, also formed of ferrite, are connected to the pole pieces 72 and 73 and extend across to the ends of the rods 74 to, in effect, provide an electromagnet assembly which resembles a "C."

Before the plates 76 and 77 are put into place, coils 78 of two parallel windings wound on spools 79 of suitable insulating material such as plastic which are positioned within the rectangular recesses 14 and are mounted over the pole pieces 72 and 73. It can be seen that the coils 78 on the spools 79 are positioned in relatively close proximity to each of the circulators. When the spools 79 are in place, the plates 76 and 77 are cemented in place so that they lie on the ledges 22 and extend between the pole pieces 72 and 73 and the rods 74 to provide the C-shaped electromagnet assembly 71. It should be pointed out that the pole pieces 72 and 73 and the rod 74, which forms the return path, are ground to relatively precise lengths so that air gaps are not necessary. In practice, a small air gap may be provided between the plates 76 and 77 and the rod 74 which can be adjusted by the use of shims so that each circulator can be made to operate with substantially the same current as the other circulators. After the desired spacing has been achieved, the plates 76 and 77 are cemented into place by suitable material such as epoxy resin.

Thin plates 81 of a suitable material such as plastic are disposed between the plates 76 and 77 and serve to enclose the remainder of the rectangular recess 14. The plates 81 are provided with small holes 82 to facilitate their removal from the bodies 12 and 13.

In view of the fact that the saturization magnetization of the ferrite which is used for the core of the electromagnet assembly 71 and the garnet which is used as the gyromagnetic element both change with temperature, thermistors 83 mounted on the body 12 have been provided. A plurality of resistors 86 have also been provided and are mounted upon a board 87 mounted upon the body 11, These resistors 86 are brought out to terminals 88 so that any desired amount of resistance can be placed in series with the windings on the coils 78 to select the particular frequency of operation desired. Thus, the resistors 86 serve as a tuning mechanism, whereas the thermistors 83 serve as a temperature compensating means. As hereinafter explained, changing the magnetic field changes the frequency of operation of the switching circulator because of the change of the magnetic bias in the circulators.

A pair of wave guide fittings 91 and 92 are mounted on the housing 11 and are connected to the inlet ports 36 and 37. A wave guide fitting 93 is also mounted on the housing 11 and is connected to the outlet port 38. Each of the wave guide fittings 91, 92 and 93 is provided with two 90° bends.

A pair of power monitor probes 96 are mounted on the body 13 adjacent the inlet ports 36 and 37 and are utilized for monitoring to determine whether or not power is being received in the inlet ports 36 and 37. A mounting plate 97 is secured to the input wave guide 93.

Operation of the switching circulator shown in FIGURES 1–9 may now be briefly described as follows. Let it be assumed that it is desired to utilize the switching circulator for switching power from one of two transmitters to a transmission line and that the two inlet wave guide fittings 91 and 92 are connected to the two transmitters and that the output wave guide fitting 93 is connected to a transmission line. During operation of the switching circulator, a D-C current is applied to the coils of each of the electromagnets from a battery 98 through a switching circuit 99 (see FIGURE 4) to establish a polarized magnetic field which is transverse to the propagation of energy through the input ports 36 and 37. This very strong, highly polarized magnetic field biases the garnet triangle in each of the circulators into one condition to operate in a manner well known to those skilled in the art so that energy appearing in one branch of the circulator is coupled to only one other branch or transmission line section. When the garnet triangle is biased into an opposite condition, the energy will be coupled to the other branch. Thus, if it is assumed that it is desired to transmit the energy from the transmitter connected to the wave guide fitting 91, the energy will be introduced into the first circulator from the left as viewed in FIGURE 7, through the inlet port 36. The garnet triangle 56 will be biased so that the energy will be coupled into the transmission line section 28 and into the second circulator 26 which is biased to couple the energy to the third circulator and out the outlet port 38 into the wave guide fitting 93 and into the transmission line.

Conversely, if it is assumed that for some reason the transmitter connected to the wave guide fitting 91 fails to produce output power, this will be sensed by the power monitoring probe 96 and the switching circuit 99 to cause a switching operation to take place which causes a direct current to be applied to the other winding of each of the coils 78 so that the electromagnets establish a magnetic field which is polarized in the opposite direction to bias the circulators into an opposite condition. When this is the case, energy from the transmitter connected to the wave guide fitting 92 will be supplied through the inlet port 37 and will be coupled by the fifth circulator from the left as viewed in FIGURE 7 to the transmission line section 29 to the fourth circulator from the left as viewed in FIGURE 11 to the third circulator and out the port 38 to the fitting 93 and to the transmission line.

Energy introduced into the switching circulator from the standby transmitter through the other inlet port passes to two of the loads, the stepped load 61 and the cone-shaped load 62, and then instead of going out the center output port 38, is introduced into the second circulator from the left when the energy introduced into port 36 is being used and the fourth circulator from the left when energy introduced into port 37 is being used. These circulators behave as terminations to effectively provide three terminations, the latter of which may be called a virtual termination. This virtual termination is adjusted by the screws 68.

By way of example, the switching circulator of the type shown in FIGURES 1–9 has the following characteristics:

Isolation— 75 db.
Insertion loss—.7 db.
Switching time—.0013 second.
Switching power—less than 10 watts.

It should be pointed out that the switching circulator shown in FIGURES 1–9 is a symmetrical device in that there are two circulators provided on each side of the center circulator which is the output circulator. It should be appreciated, however, that, if desired, an even number of circulators can be provided. In such a case, one could be used as a fixed circulator, whereas the other could be used as a switching circulator. Thus, it can be appreciated that any number of combinations can be used; for example, one non-switched circulator and two switched circulators could also be used. When all switched circulators are used, it is desirable to use an odd number of circulators as, for example, 1, 3, 5, 7, etc., circulators to achieve symmetry.

The switching circulator herein disclosed is particularly advantageous in that switching can be accomplished within a very short time, as pointed out above, approximately .001 of a second. This is possible even though a transverse magnetic field is utilized. This is made possible because of the slots provided in the housing 11 which prevent the housing from acting as a shorted-turn with respect to each of the electromagnetic assemblies 71. The slots are prevented from resonating by applying a thin conducting sheet over the same which serves as a conductor for the microwave energy. The use of slots has made it possible to make the device into a switching device which is very fast.

The eddy currents in the switching circulator have been reduced to a minimum because the metal which is immediately under the pole pieces is very thin. For this reason, eddy current losses are very small and have substantially no adverse effect on the switching time.

Figure 6:
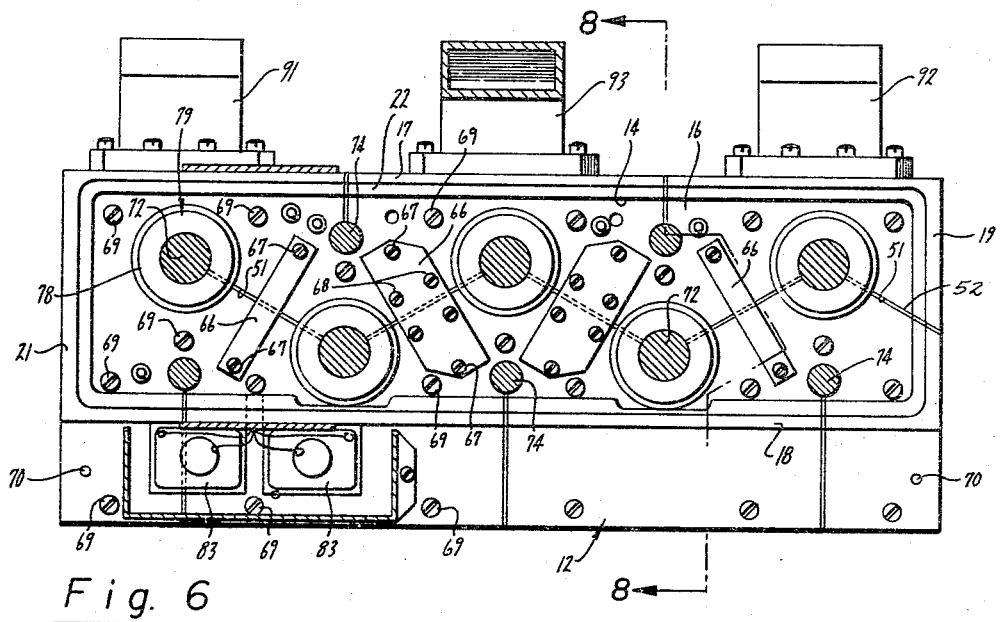
FIGURE 6 is a cross-sectional view taken along the line 6—6 of FIGURE 5.

It should be pointed out that the particular positioning of the slots, as shown in FIGURES 6 and 7 of the drawings, is not particularly necessary. It is only necessary that the slots extend from the pole pieces or from the holes to the exterior of the body so as to prevent the formation of a meal conductor surrounding the pole pieces of the electromagnet assembly. Thus, as shown in FIGURE 10, a very different arrangement of the slots 51 can be provided to accomplish the same purpose.

Although the switching circulators shown in FIGURES 1–9 are adapted particularly for use with a rectangular wave guide, it should be appreciated that a switching circulator incorporating the present invention can also be utilized with transmission line sections of the coaxial type. Thus, as shown in FIGURES 11, 12 and 13, a switching circulator is shown which consists of a housing 101. The housing 101 is formed of two bodies 102 and 103 of a material such as aluminum. The bodies 102 and 103 are secured together into a unitary assembly by suitable means such as screws 104. An element 108 of a suitable gyromagnetic material such as garnet is mounted within each of the bodies 102 supported therein by suitable dielectric material 109. A hole 111 is provided in each of the bodies 102 and 103 in alignment with the cylindrical gyromagnetic elements. Another hole 112 is provided in each of the bodies 102 and 103 spaced from and parallel to the hole 111. A slot 113 is also formed in each of the bodies 102 and 103 extending from the hole 111 through the hole 112 to the exterior of the body. This slot is filled with a suitable insulating material 114 such as an epoxy resin.

Three coaxial connectors 116, 117 and 118 are mounted upon the housing 101 and are provided with terminals 119 which are connected to a Y-shaped strip line 121 of a suitable material such as brass. The legs of the Y-shaped element 121 form a junction 122 in an area between the gyromagnetic elements 108.

Means is provided for establishing a magnetic field which is applied transversely, i.e., at right angles to the direction of propagation of the wave energy in the strip line 121 and consists of pole pieces 126 and 127 of suitable material such as ferrite which are mounted in the holes 111 and secured therein by suitable means such as cement so that the faces of the pole pieces are adjacent the gyromagnetic elements 108. A thin sheet 128 of a suitable conducting material such as aluminum foil is cemented over each of the bodies 102 and 103 and over the slot 113 and over the pole pieces mounted therein to provide an element which is conductive to microwave energy. As pointed out with the previous embodiment, this sheet of conducting material may or may not be in contact with the bodies 102 and 103. Coils 131 carried on insulated spools 132 are disposed on the pole pieces 126 and 127. A return path for the pole pieces is provided by plates 133 and 134 and a rod 136 all formed of suitable material such as ferrite. The plates 133 and 134 are cemented in the housing 101.

Operation of this embodiment of my switching circulator is very similar to the operation of the switching circulator hereinbefore described. The coil 131 has two windings. Thus, when direct current flows in one direction through the winding, a polarized magnetic field is established to bias the gyromagnetic elements 108 into one condition which causes wave energy supplied to one of the connectors 116, 117, 118 to be coupled to only one of the other connectors. When current is applied to the other of the windings of the coil, the magnetic field is polarized in an opposite direction to bias the gyromagnetic elements into an opposite condition to cause the wave energy to be coupled to the other of the two connectors.

It should be noted that in this embodiment the slots 113 in the bodies 102 and 103 prevent the formation of a conducting path around the pole pieces 126 and 127 and the return path rod 136 which would create a shorted-turn effect. This shorted-turn is overcome by placing the slot in the housing which extends from the pole pieces and the rod to the exterior of the housing. Eddy current losses are very low because of the use of the thin sheets 128.

It is apparent from the foregoing that I have provided a switching circulator in which it is possible to utilize a transverse magnetic field while at the same time achieving very high switching speeds. This is primarily accomplished because slots have been formed in the metal body surrounding the pole pieces to prevent the formation of conducting paths around the pole pieces. It should be appreciated that if desired, the present invention can also be used where a D.C. magnetic bias is only applied in one direction.

I claim:

1. In a circulator, a metal housing having at least first, second and third transmission line sections interconnected by a junction formed therein, means for establishing a magnetic field transverse to the direction of propagation of wave energy in the transmission line sections, said means for establishing a magnetic field consisting of first and second spaced apart pole pieces disposed in the metal housing, a coil mounted on each of the pole pieces, a body of gyromagnetic material disposed between said pole pieces and at said junction, the housing being formed with slots extending from the pole pieces to a point external of the housing to prevent the formation of a conducting path around the pole pieces, means for causing a D.C. current to flow in each of said coils to establish the magnetic field, and a thin conducting element disposed on opposite sides of the body of gyromagnetic material and overlying said slots together with an electrical insulating material filling said slots and serving as support for said conducting element.

2. A switching circulator as in claim 1 wherein said first, second and third transmission line sections are rectangular wave guide sections.

3. A switching circulator as in claim 1 wherein said first, second and third transmission line sections are strip lines.

4. In a switching circulator, a metal housing having at least first, second and third transmission line sections interconnected by a junction formed therein, a gyromagnetic element disposed at said junction, means for applying a magnetic field to the gyromagnetic element transverse to the direction of propagation of wave energy in the transmission line sections, said last named means including first and second pole pieces disposed on opposite side of said gyromagnetic element and disposed within the housing, means forming a magnetic return path for said first and second pole pieces, the housing having slots therein extending from the first and second pole pieces to the exterior of the housing to prevent the formation of a conducting path in the housing around the pole pieces, a thin conducting element opposed on opposite sides of the gyromagnetic element and overlying said slots, an electrical insulating material filling and slots and serving as support for said conducting element, and means forming an electromagnetic coil is coupled to said pole pieces for creating a magnetic field through said gyromagnetic element.

5. A switching circulator as in claim 4 wherein said first and second pole pieces and said means forming a return path is formed of ferrite.

6. In switching circulator apparatus, a metal housing having a plurality of circulators therein, each of said circulators having first, second and third transmission line sections interconnected by a junction formed therein, said transmission line sections being interconnected so that said circulators are connected in series, a gyromagnetic element disposed at each of said junctions, means for establishing a magnetic field in each of said circulators transverse to the direction of propagation of wave energy in the transmission line sections, said last named means including first and second pole pieces disposed in the housing on opposite sides of said gyromagnetic element, the housing being formed with slots extending from the pole pieces to the exterior of the body to prevent the formation of a conducting path around the pole pieces, a thin conducting element disposed on opposite sides of the gyromagnetic element and overlying said slots, an electrical insulating material filling said slots and serving as support for said conducting element, a coil mounted on each of said pole pieces, means for forming a return path for said pole pieces, and means for terminating certain of said transmission line sections.

7. In a switching circulator, a metal housing having at least first, second and third transmission line sections interconnected by a junction formed therein, a gyromagnetic element disposed at said junction, means for applying a magnetic field to the gyromagnetic element transverse to the direction of propagation of wave energy in the transmission line sections, said last named means including first and second pole pieces disposed on opposite sides of said gyromagnetic element and disposed within the housing, means forming a magnetic return path for said first and second pole pieces, the housing having slots therein extending from the first and second pole pieces to the exterior of the housing to prevent the formation of a conducting path in the housing around the pole pieces, said means for forming a return path including an element having magnetic properties disposed in said metal housing, and means forming an electromagnetic coil coupled to said pole pieces for creating a magnetic field through said gyromagnetic element, said metal housing having a slot extending from said element having magnetic properties to the exterior of the housing.

8. In switching circulator apparatus, a metal housing having a plurality of circulators therein, each of said circulators having first, second and third transmission line sections interconnected by a junction formed therein, said transmission line sections being interconnected so that said circulators are connected in series, a gyromagnetic element disposed at each of said junctions, means for establishing a magnetic field in each of said circulators transverse to the direction of propagation of wave energy in the transmission line sections, said last named means including first and second pole pieces disposed in the housing on opposite sides of said gyromagnetic elements, the housing being formed with slots extending from the pole pieces to the exterior of the body to prevent the formation of a conducting path around the pole pieces, a coil mounted on each of said pole pieces, means for forming a magnetic return path for said pole pieces, said means having a small air gap, said gap being adjustable so that the magnetic bias to each of the circulators is adjustable to permit operation of each of said circulators at the same frequency and current, and means for terminating certain of said transmission line sections.

9. In switching circulator apparatus, a metal housing having at least three circulators therein, each of said circulators having first, second and third transmission line sections connected by a junction formed therein, said transmission line sections being interconnected so that said circulators are connected in series to form two signal paths through the apparatus, one of said circulators being common to both signal paths, a gyromagnetic element disposed at each of said junctions, means for establishing a magnetic field in each of said circulators transverse to the direction of propagation of wave energy in the transmission line sections, said last named means including first and second pole pieces disposed in the housing on opposite sides of said gyromagnetic element, the housing being formed with slots extending from the pole pieces to the exterior of the body to prevent the formation of a conducting path around the pole pieces, a coil mounted on each of said pole pieces, means for forming a return path for said pole pieces, and means for terminating certain of said transmission line sections.

10. Switching circulator apparatus as in claim 18 in which there are five circulators and in which each of said signal paths comprises two of said five circulators connected in series with said common circulator.

References Cited

UNITED STATES PATENTS

| 2,114,189 | 4/1938 | Kronmiller | 336—84 |
| 2,908,878 | 10/1959 | Sullivan et al. | 333—98 |
| 2,998,579 | 8/1961 | Rizzi. | |
| 3,101,458 | 8/1963 | Chandler et al. | 333—24.2 |
| 3,104,361 | 9/1963 | Leetmaa et al. | 333—1.1 |
| 3,165,711 | 1/1965 | Drumheller et al. | 333—1.1 |
| 3,231,835 | 1/1966 | Nielsen et al. | 333—1.1 |

OTHER REFERENCES

Electronics, September 22, 1961, page 41 relied on.

HERMAN KARL SAALBACH, *Primary Examiner.*

P. L. GENSLER, *Assistant Examiner.*